United States Patent
Cho et al.

(10) Patent No.: US 11,598,325 B2
(45) Date of Patent: Mar. 7, 2023

(54) METHOD FOR DETERMINING DISPENSING APPARATUS FOR HEAT-DISSIPATING MATERIAL

(71) Applicant: LG Chem, Ltd., Seoul (KR)

(72) Inventors: Yoon Gyung Cho, Daejeon (KR); Se Woo Yang, Daejeon (KR); Yang Gu Kang, Daejeon (KR); Eun Suk Park, Daejeon (KR); Hyun Suk Kim, Daejeon (KR); Hyoung Sook Park, Daejeon (KR); Sang Min Park, Daejeon (KR); Young Jo Yang, Daejeon (KR)

(73) Assignee: LG Chem, Ltd.

( * ) Notice: Subject to any disclaimer, the term of this patent is extended or adjusted under 35 U.S.C. 154(b) by 226 days.

(21) Appl. No.: 16/641,120

(22) PCT Filed: Aug. 22, 2018

(86) PCT No.: PCT/KR2018/009638
§ 371 (c)(1),
(2) Date: Feb. 21, 2020

(87) PCT Pub. No.: WO2019/039852
PCT Pub. Date: Feb. 28, 2019

(65) Prior Publication Data
US 2020/0208618 A1    Jul. 2, 2020

(30) Foreign Application Priority Data

Aug. 22, 2017   (KR) .................. 10-2017-0105934
Aug. 22, 2018   (KR) .................. 10-2018-0097734

(51) Int. Cl.
*F04B 51/00*   (2006.01)
*F04B 19/22*   (2006.01)
(Continued)

(52) U.S. Cl.
CPC .............. *F04B 19/22* (2013.01); *F04B 51/00* (2013.01); *F04B 53/10* (2013.01); *F04B 53/14* (2013.01); *F04C 2/18* (2013.01); *F04C 14/28* (2013.01)

(58) Field of Classification Search
CPC .......... F04B 19/22; F04B 51/00; F04B 53/10; F04B 53/14; F04C 14/28
See application file for complete search history.

(56) References Cited

U.S. PATENT DOCUMENTS 4,366,918 A * 1/1983 Naka .................. B01F 15/0454
                                                                  222/134
4,492,461 A * 1/1985 Jones ................. G01N 15/0612
                                                                   356/38
(Continued)

FOREIGN PATENT DOCUMENTS

CN    101393108 B  *  9/2010
CN    101869812 A    10/2010
(Continued)

OTHER PUBLICATIONS

An On-Line Ferromagnetic Wear Debris Sensor for Machinery Condition Monitoring and Failure Detection, by K. W. Chambers and M. C. Arneson (Year: 1988).*
(Continued)

*Primary Examiner* — Thomas Fink
(74) *Attorney, Agent, or Firm* — Lerner, David, Littenberg, Krumholz & Mentlik, LLP

(57) ABSTRACT

A method for determining a dispensing apparatus for a heat-dissipating material and according to one aspect of the present invention is provided. The method for determining a dispensing apparatus for a heat-dissipating material includes detecting an internal material of a dispensing apparatus from a heat-dissipating material discharged from the dispensing
(Continued)

apparatus; and determining suitability of the dispensing apparatus based on the detected amount of the internal material.

11 Claims, 6 Drawing Sheets

(51) Int. Cl.
*F04B 53/10* (2006.01)
*F04B 53/14* (2006.01)
*F04C 2/18* (2006.01)
*F04C 14/28* (2006.01)

(56) References Cited

U.S. PATENT DOCUMENTS

| | | | | |
|---|---|---|---|---|
| 4,741,623 | A | * | 5/1988 | Haeuser ................ B29B 7/7457 425/200 |
| 4,869,954 | A | * | 9/1989 | Squitieri ................ B32B 27/40 442/13 |
| 6,386,237 | B1 | | 5/2002 | Chevalier et al. |
| 2001/0007013 | A1 | | 7/2001 | Teramoto et al. |
| 2003/0222249 | A1 | | 12/2003 | Bunyan et al. |
| 2006/0247355 | A1 | | 11/2006 | Kosaka et al. |
| 2009/0107921 | A1 | | 4/2009 | Chen et al. |
| 2010/0051855 | A1 | | 3/2010 | Kunitomo et al. |
| 2011/0162447 | A1 | * | 7/2011 | Kirk ........................ F04B 51/00 73/168 |
| 2012/0001619 | A1 | * | 1/2012 | Ukai .................. G01N 33/2858 324/204 |
| 2012/0258000 | A1 | * | 10/2012 | Patton ..................... F04C 2/165 418/1 |
| 2012/0325864 | A1 | | 12/2012 | Imaizumi et al. |
| 2015/0345688 | A1 | | 12/2015 | Kersey et al. |
| 2016/0201667 | A1 | * | 7/2016 | Tonami ................ F04C 2/1075 418/156 |
| 2019/0056061 | A1 | * | 2/2019 | Henneberg ............. F16N 29/00 |

FOREIGN PATENT DOCUMENTS

| | | |
|---|---|---|
| EP | 3662992 A2 | 6/2020 |
| JP | H06228449 A | 8/1994 |
| JP | 2001163989 A | 6/2001 |
| JP | 201070583 A | 4/2010 |
| JP | 2010155942 A | 7/2010 |
| JP | 201150862 A | 3/2011 |
| JP | 4728731 B2 | 7/2011 |
| JP | 5227801 B2 | 7/2013 |
| JP | 2015131909 A | 7/2015 |
| KR | 20130036216 A | 4/2013 |
| WO | 9008915 A1 | 8/1990 |
| WO | 2017112653 A1 | 6/2017 |

OTHER PUBLICATIONS

Machinerylubrication.com, URL: https://web.archive.org/web/20170802065533/https://www.machinerylubrication.com/Read/854/oil-analysis-tests, by Ashley Mayer, published Aug. 2, 2017 (Year: 2017).*
Chinese Search Report for Application No. 201880053601.5 dated Mar. 26, 2021, pp. 1-2.
Extended European Search Report including Written Opinion for Application No. EP18848936.3, dated Jul. 23, 2020, pp. 1-9.
International Search Report for Application No. PCT/KR2018/009638 dated Nov. 28, 2018, 3 pages.

* cited by examiner

[Figure 1]
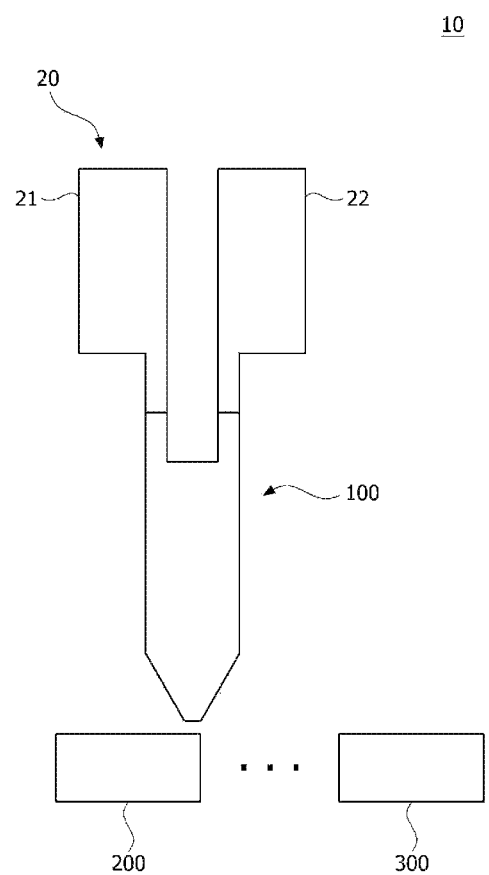

[Figure 2]
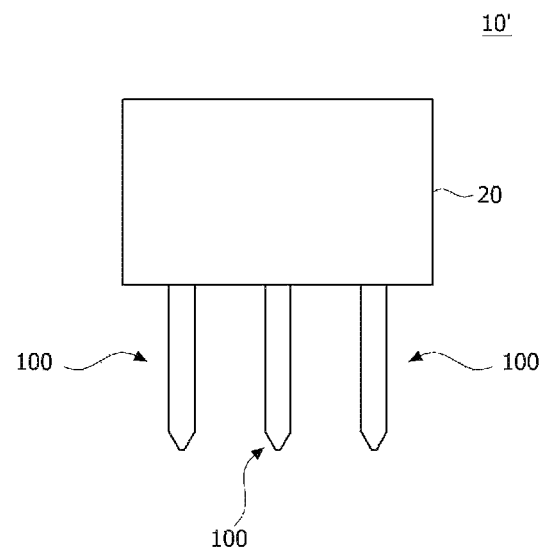
[Figure 3]
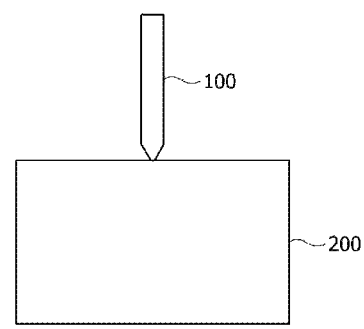

[Figure 4]
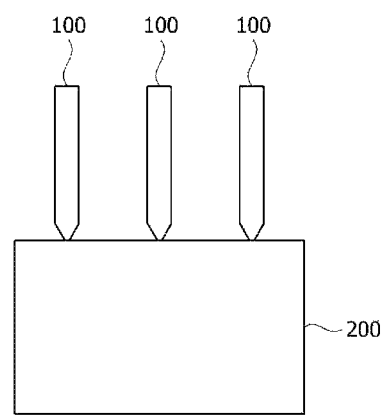

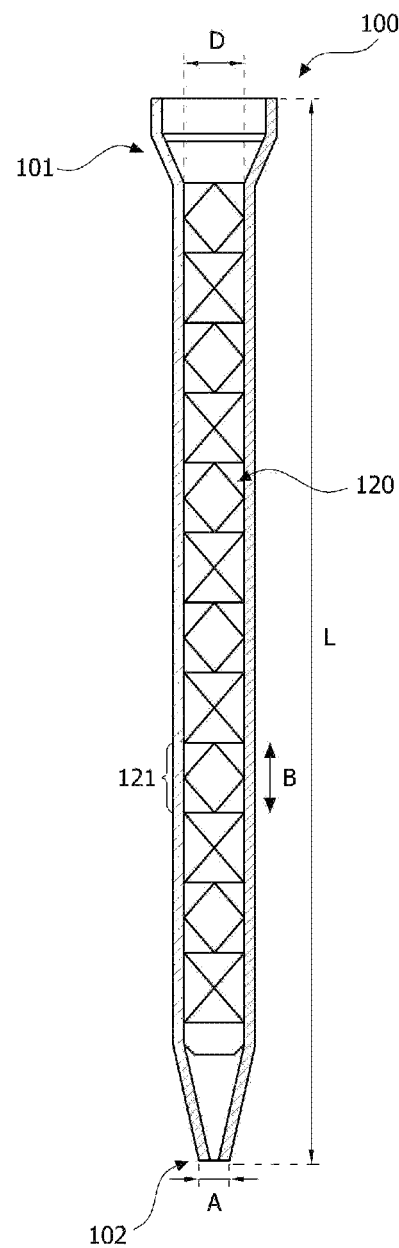
[Figure 5]

[Figure 6]
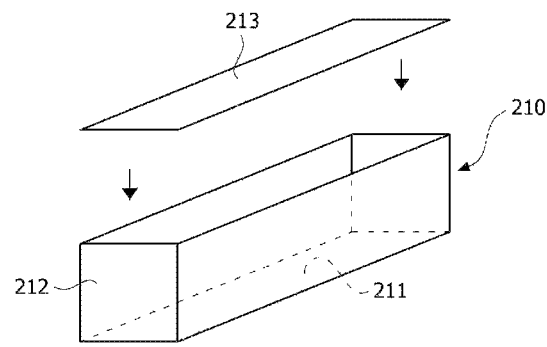
[Figure 7]
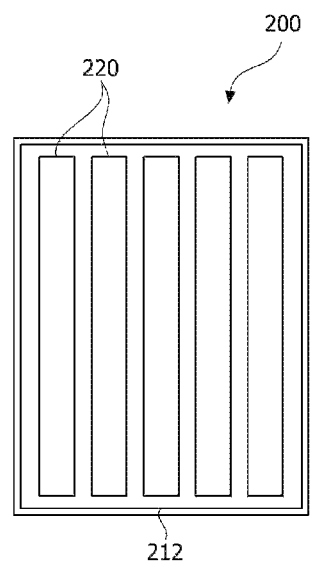

[Figure 8]
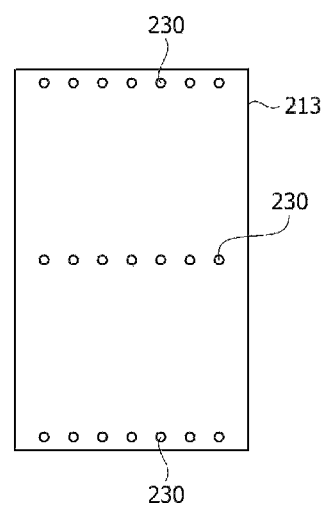

METHOD FOR DETERMINING DISPENSING APPARATUS FOR HEAT-DISSIPATING MATERIAL

CROSS-REFERENCE TO RELATED APPLICATIONS

The present application is a national phase entry under 35 U.S.C. § 371 of International Application No. PCT/KR2018/009638 filed Aug. 22, 2018, which claims priority from Korean Patent Application No. 10-2017-0105934 filed on Aug. 22, 2017 and Korean Patent Application No. 10-2018-0097734 filed on Aug. 22, 2018, the disclosures of which are incorporated herein by reference in their entirety.

TECHNICAL FIELD

The present invention relates to a method for determining a dispensing apparatus for a heat-dissipating material.

BACKGROUND ART

A battery, a television, a video, a computer, a medical instrument, an office machine or a communication device, and the like generates heat during operation and a temperature rise due to the heat causes operation failure or destruction, and the like, so that a heat-dissipating method for suppressing the temperature rise or a heat-dissipating member used for the method, and the like has been proposed.

For example, there is known a method in which heat is transferred to a cooling medium such as cooling water, or a temperature rise is suppressed through heat conduction to a heat sink using a metal plate or the like having a high thermal conductivity such as aluminum or copper.

In order to efficiently transfer heat from a heat source to a cooling medium or a heat sink, it is advantageous that the heat source adheres to the cooling medium or the heat sink as close as possible or is thermally connected thereto, and a heat-dissipating material can be used for this purpose.

On the other hand, there is a demand for a dispensing apparatus that requires high heat-dissipation performance due to high power output of a battery module, increases a filling amount of a heat-dissipation filler, and is applicable to an irregular portion while reducing thermal resistance by a thin thickness upon filling.

Furthermore, upon selecting a dispensing apparatus, it is important to determine it by predicting a lifetime and a durability problem due to abrasion.

DISCLOSURE

Technical Problem

It is a problem to be solved by the present invention to provide a method for determining a dispensing apparatus for a heat-dissipating material capable of predicting a lifetime and durability due to abrasion.

Technical Solution

To solve the above-described problem, according to one aspect of the present invention, there is provided a method for determining a dispensing apparatus for a heat-dissipating material, comprising steps of: detecting an internal material of a dispensing apparatus from a heat-dissipating material discharged from the dispensing apparatus; and determining suitability of the dispensing apparatus based on the detected amount of the internal material.

Also, in the step of determining suitability, if the internal material is detected below a predetermined amount, the dispensing apparatus may be determined to be suitable.

Furthermore, the internal material may comprise iron (Fe).

In addition, in the step of determining suitability, if the iron is detected below 30 mg/kg, the dispensing apparatus may be determined to be suitable.

Also, in the step of determining suitability, preferably, if the iron is detected below 10 mg/kg, the dispensing apparatus may be determined to be suitable.

Furthermore, the heat-dissipating material may comprise a resin component of urethane series and a thermally conductive filler.

In addition, the heat-dissipating material may comprise a filler having a Mohs hardness of 8 or more.

Also, the filler having a Mohs hardness of 8 or more may be present in an amount of 80 wt % or more relative to the total weight of the filler in the heat-dissipating material.

Furthermore, the filler may be present in an amount of 70 wt % or more relative to the total weight of the heat-dissipating material.

In addition, the dispensing apparatus may comprise a dispensing part equipped with first and second supply cartridge portions, and one or more static mixers individually connected to the first and second supply cartridge portions, respectively. At this time, the heat-dissipating material flows out through the static mixer. The present invention relates to detecting an internal material of a dispensing apparatus from a heat-dissipating material that flows out through a static mixer.

Also, the first supply cartridge portion may be provided to supply a main resin and a thermally conductive filler to the static mixer, and the second supply cartridge portion may be provided to supply a curing agent and a thermally conductive filler to the static mixer.

Furthermore, the first and second supply cartridge portions may be configured as a gear pump type or a plunger type, respectively.

Advantageous Effects

As described above, according to the method for determining a dispensing apparatus for a heat-dissipating material related to one example of the present invention, the suitability of the dispensing apparatus may be determined by detecting the internal material of the dispensing apparatus from the heat-dissipating material discharged from the dispensing apparatus.

BRIEF DESCRIPTION OF DRAWINGS

FIG. 1 is a schematic diagram showing a dispensing apparatus used in a method for determining a dispensing apparatus for a heat-dissipating material related to one example of the present invention.

FIG. 2 is a schematic diagram showing another embodiment of the dispensing apparatus.

FIGS. 3 and 4 are schematic diagrams showing embodiments in which a heat-dissipating material is injected into a first external device.

FIG. 5 is a schematic diagram of the static mixer shown in FIG. 1.

FIG. 6 is a schematic diagram of a module case constituting a battery module.

FIG. 7 is a schematic diagram showing a battery module.

FIG. 8 is a schematic diagram for explaining injection holes of a module case.

MODE FOR INVENTION

Hereinafter, a method for determining a dispensing apparatus for a heat-dissipating material according to one example of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a schematic diagram showing a dispensing apparatus (10) used in a method for determining a dispensing apparatus of a heat-dissipating material related to one example of the present invention, FIG. 2 is a schematic diagram showing another embodiment of a dispensing apparatus (10'), and FIGS. 3 and 4 are schematic diagrams showing embodiments in which a heat-dissipating material is injected into a first external device (200).

Also, FIG. 5 is a schematic diagram of the static mixer (100) shown in FIG. 1.

The dispensing apparatus (10, 10') for a heat-dissipating material related to the present invention is an apparatus for injecting a heat-dissipating material including a room-temperature curing filler into an external device.

Referring to FIG. 1, a heat-dissipating material may be injected into an external device (200, 300) through a dispensing apparatus (10). The dispensing apparatus (10) comprises a dispensing part (20) and one or more static mixers (100) connected to the dispensing part (20). The external device may be a battery module.

In this embodiment, the first external device refers to a first battery module and the second external device refers to a second battery module. The first and second battery modules are merely terms that are stated separately in order to explain process units in turn, and have the same structure.

In the dispensing apparatus (10, 10'), the mixing and the injection of the heat-dissipating material are performed through static mixers (100). In addition, the mixing of the heat-dissipating material may be performed in each static mixer (100), and the injection of the heat-dissipating material for one battery module may be performed through a plurality of static mixers (100).

FIG. 6 is a schematic diagram of a module case (210) constituting a battery module, FIG. 7 is a schematic diagram showing a battery module (200), and FIG. 8 is a schematic diagram for explaining injection holes (230) of a module case.

The battery module (200) comprises a module case (210) and a plurality of battery cells (220) disposed in the module case (210). The battery cell (220) may be a pouch-type secondary battery. The battery cell (200) may typically comprise an electrode assembly, an electrolyte, and a pouch exterior material. The heat-dissipating material is injected into spaces between the battery cells in the module case and functions to dissipate heat generated in the battery cells (220).

The module case (210) may have, for example, a cuboidal shape and may have a bottom surface (211), side surfaces (212) and a top surface (213). At this time, one or more injection holes (230) may be formed on the top surface (213). At this time, one static mixer (100) is connected to one injection hole (230), so that the heat-dissipating material flowing out of the static mixer (100) can be injected into the battery module (200) through the injection hole (230).

In addition, the step of injecting a heat-dissipating material may be sequentially performed on a plurality of battery modules. For example, referring to FIG. 1, after the heat-dissipating material is completely injected into the first battery module (200), the heat-dissipating material may be injected into the second battery module (300). The first and second battery modules (200, 300) are transferred by a transfer part (for example, a belt conveyor) and sequentially passed through the dispensing apparatus (100), whereby a heat-dissipating material can be injected.

In the injection of a heat-dissipating material, referring to FIG. 3, the heat-dissipating material may also be injected into one battery module (for example, the first battery module, 200) through one static mixer, and referring to FIG. 4, the heat-dissipating material may be injected into one battery module (for example, the first battery module, 200) through a plurality of static mixers (100).

The dispensing apparatus (100) for mixing and injecting a heat-dissipating material, related to the present invention, comprises a dispensing part (20) and one or more static mixers (100) connected to the dispensing part (20). The static mixer (100) may be provided interchangeably.

Also, the heat-dissipating material mixed through the static mixer and injected into a battery module relates to a thermally conductive resin composition. The resin composition may comprise a resin component and a thermally conductive filler.

The dispensing part (20) comprises a first supply cartridge portion (21) and a second supply cartridge portion (22). At this time, the first supply cartridge portion (21) and the second supply cartridge portion (22) are connected to the static mixer (100) individually. The first supply cartridge portion (21) supplies a main resin and a thermally conductive filler for forming a resin composition to the static mixer (100) and the second supply cartridge portion (22) supplies a curing agent and a thermally conductive filler to the static mixer (100).

Referring to FIG. 5, the static mixer (100) has an inflow part (101) and an outflow part (102). As described above, the inflow part (101) is provided to be separately connected to the first supply cartridge portion (21) and the second supply cartridge portion (22), and the outflow part (102) is provided to be connected to injection holes (230) provided at the module case (210) of the battery module (200).

The static mixer (100) comprises a screw part (120) for mixing and transfer. The screw part (120) is composed of a plurality of elements (121) and one element (121) forms one stage (B), where the number of elements (121) can be referred to as a number of stages.

At this time, the number of elements (121) of the static mixer (100) may be 5 to 25. If the number of elements (121) is insufficient, the mixing efficiency lowers, which may affect the curing speed, the adhesive force, the insulating property, and the like, or cause reliability problems. Alternatively, if the number of elements (121) is excessively large, a mixer having a small diameter and a long length is used to maintain the same mixer capacity, and thus the process speed is lowered.

In one embodiment, the static mixer (100) has a mixer inner diameter (D) of about 9 mm, where the screw part (120) is disposed, a screw part (120) width of 5 mm, an outflow part (102) diameter (A) of 3 mm, a mixer length (L) of 225 mm and a number of stages of 24.

The first and second supply cartridge portions (21, 22) may each comprise a positive-displacement pump, for supplying a main resin and a curing agent to a static mixer. The positive-displacement pump is a pump having a type that a space is provided in a reciprocating portion or a rotating portion, and fluids (for example, a main resin/a curing agent) are placed in the space and simultaneously discharged in turn, which is divided into a reciprocating pump and a rotary pump. The first and second supply cartridge portions (21, 22) may each comprise a reciprocating pump or a rotary pump.

The characteristics of the positive-displacement pump are that the discharge amount fluctuates during operation, but the high pressure is generated and the efficiency is good. Furthermore, even if the pressure is changed, the discharge amount does not change.

The reciprocating pump is a pump that a fluid is sucked by reciprocating a piston or plunger in a cylinder, compressed at a desired pressure and discharged. There are several types of pumps. There are a manual pump that a discharge valve is installed on a piston, a single-acting plunger pump which is sucked and discharged whenever a rod-like plunger reciprocates, and a double-acting plunger pump that sucking and discharging are performed every reciprocation of a plunger, and besides, for increasing a flow rate and reducing variation of a discharge amount, there is also a pump in which two or more single-acting ones are connected in parallel.

In addition, the reciprocating pump has a small amount of pumping discharge, but has a simple structure and is suitable for a high lifting height (high-pressure). However, since the fluctuation of water-delivery pressure generated on the reciprocating action is severe, there is a change in the discharge amount and the quantity control is difficult.

Furthermore, the rotary pump is a pump that a liquid is pumped by rotation of one to three rotors, which is simple in structure and easy to handle. The characteristics of the pump are that the fluctuation of the pumping discharge is small, and it is relatively easy to obtain a high pressure and is suitable for transporting a liquid having a high viscosity such as oil. There are many kinds according to the shape or structure of the rotor, but a typical example thereof includes a vane pump, a gear pump, a screw pump and the like.

The present invention relates to a method for determining a dispensing apparatus for a heat-dissipating material.

The method for determining a dispensing apparatus for a heat-dissipating material comprises steps of detecting an internal material of a dispensing apparatus from a heat-dissipating material discharged from the dispensing apparatus and determining suitability of the dispensing apparatus based on the detected amount of the internal material. The heat-dissipating material flowing out of the dispensing apparatus means a heat-dissipating material discharged from the static mixer.

Also, an ICP analysis method can be used as the method of detecting the internal material. For example, the used instrument may be ICP-OES (Optima 8300DV), and 0.2 g of the heat-dissipating material discharged from the static mixer may be treated with nitric acid/hydrogen peroxide and then filtered using a 0.45 μm PTFE syringe and analyzed by ICP-OES.

Based on the analytical results, in the step of determining suitability, if the internal material is detected below a predetermined amount, the dispensing apparatus may be determined to be suitable.

Furthermore, the internal material may comprise iron (Fe).

In addition, in the step of determining suitability, if the iron is detected below 30 mg/kg, the dispensing apparatus may be determined to be suitable.

Also, in the step of determining suitability, preferably, if the iron is detected below 10 mg/kg, the dispensing apparatus may be determined to be suitable.

Furthermore, the heat-dissipating material may comprise a resin component of urethane series and a thermally conductive filler.

In addition, the heat-dissipating material may comprise a filler having a Mohs hardness of 8 or more.

Also, the filler having a Mohs hardness of 8 or more may be present in an amount of 80 wt % or more relative to the total weight of the entire filler in the heat-dissipating material.

Furthermore, the filler may be present in an amount of 70 wt % or more relative to the total weight of the heat-dissipating material.

TABLE 1

| Classification | Pump Type | Filler | Mohs Hardness | wt % | Fe (mg/Kg) | Suitability |
|---|---|---|---|---|---|---|
| Example 1 | Gear | Alumina | 9 | 60 | less than 5 | ○ |
| Example 2 | Gear | AlN | 8 | 60 | less than 5 | ○ |
| Example 3 | Gear | BN | 2 | 80 | less than 5 | ○ |
| Example 4 | Ceramic thermal spray gear | Alumina | 9 | 80 | less than 5 | ○ |
| Example 5 | Plunger | Alumina | 9 | 80 | less than 5 | ○ |
| Example 6 | Plunger | Alumina | 9 | 90 | less than 5 | ○ |
| Comparative Example 1 | Gear | Alumina | 9 | 80 | 135 | X |
| Comparative Example 2 | Gear | Alumina | 9 | 81 | 97 | X |
| | | BN | 2 | 9 | | |

Referring to Table 1 above, it is preferred that the heat-dissipating material comprises a filler having a Mohs hardness of 8 or more, and it is preferred in the heat-dissipating material that the filler having a Mohs hardness of 8 or more is 80 wt % or more of the entire filler. In addition, the first and second supply cartridge portions may be configured as a gear pump type or a plunger pump type.

On the other hand, the heat-dissipating material relates to a thermally conductive resin composition. The resin composition may comprise a resin component and a thermally conductive filler.

In one example, the resin composition may be an adhesive composition, for example, a composition capable of forming an adhesive through a curing reaction or the like. Such a resin composition may be a solvent type resin composition, a water-based resin composition, or a solventless-type resin composition. For example, the resin composition may be prepared by compounding a thermally conductive filler, which is described below, to a resin composition capable of forming a known acrylic adhesive, epoxy adhesive, urethane adhesive, olefin adhesive, EVA (ethylene vinyl acetate) adhesive or silicone adhesive.

The term resin component is generally used as a meaning to include components known as resins as well as components that can be converted into resins through a curing reaction or a polymerization reaction.

In one example, as the resin component, an adhesive resin or a precursor capable of forming an adhesive resin can be applied. An example of such a resin component includes an acrylic resin, an epoxy resin, a urethane resin, an olefin resin, an EVA (ethylene vinyl acetate) resin or a silicone resin, and the like, or a precursor such as a polyol or an isocyanate compound, and the like, but is not limited thereto.

The resin composition may comprise a thermally conductive filler together with the resin component. The term thermally conductive filler means a material having a thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of thermally conductive filler is not particularly limited, but ceramic fillers may be applied in consideration of insulation and the like. For example, ceramic particles such as alumina, AlN (aluminum nitride), BN (boron nitride), silicon nitride, SiC or BeO may be used. If insulation properties may be secured, application of carbon fillers such as graphite may also be considered.

The resin composition may comprise about 600 parts by weight or more of the thermally conductive filler relative to 100 parts by weight of the resin component. In another example, the ratio of the filler may be 650 parts by weight or more, or 700 parts by weight or more, relative to 100 parts by weight of the resin component. The ratio may be about 2,000 parts by weight or less, about 1,500 parts by weight or less, or about 1,100 parts by weight or less, relative to 100 parts by weight of the resin component. Within the ratio range of the filler, it is possible to secure desired physical properties such as thermal conductivity and insulation.

If the excessive amount of the filler as above is applied for securing the thermal conductivity and the insulation, the viscosity of the resin composition is greatly increased and accordingly, the handling property is lowered, and even after the resin material is formed, it contains bubbles or voids, so that the thermal conductivity may be deteriorated.

Accordingly, a filler having at least three different diameters may be applied to the resin composition at a predetermined ratio.

The shape of the filler is not particularly limited, which may be selected in consideration of viscosity and thixotropy of the resin composition, possibility of settling in the composition, the target thermal resistance or thermal conductivity, insulation, a filling effect or dispersibility, and the like. For example, considering the amount to be filled, it is advantageous to use a spherical filler, but in consideration of formation of a network, conductivity, thixotropy and the like, a non-spherical filler, for example, a filler having a shape such as a needle shape or a plate shape can also be used.

The resin composition basically comprises the above components, that is, the resin component and the thermally conductive filler, and if necessary, it may also comprise other components. For example, the resin composition may further comprise a viscosity control agent, such as a thixotropic agent, a diluent, a dispersant, a surface treatment agent or a coupling agent, for control of viscosity, for example, for increasing or decreasing viscosity, or for control of viscosity according to shear force.

The thixotropic agent can control the viscosity according to the shear force of the resin composition so that the manufacturing process of the battery module can be effectively performed. The usable thixotropic agent can be exemplified by fumed silica and the like.

The diluent or dispersant is usually used for lowering the viscosity of the resin composition, and any of various kinds known in the art can be used without limitation as long as it can exhibit the above action.

The surface treating agent is used for surface treatment of the filler introduced into the resin composition, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

The resin composition may further comprise a flame retardant or a flame retardant auxiliary agent, and the like. Such a resin composition can form a flame retardant resin composition. As the flame retardant, various known flame retardants can be applied without particular limitation, and for example, a solid filler-shaped flame retardant or a liquid flame retardant, and the like can be applied. The flame retardant includes, for example, an organic flame retardant such as melamine cyanurate, or an inorganic flame retardant such as magnesium hydroxide, and the like, but is not limited thereto.

When the amount of the filler to be filled in the resin composition is large, a liquid type flame retardant material (TEP, triethyl phosphate or TCPP, tris(1,3-chloro-2-propyl) phosphate, etc.) may also be used. Furthermore, a silane coupling agent capable of acting as a flame retardant synergist may also be added.

The preferred examples of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

As described above, according to the method for determining a dispensing apparatus for a heat-dissipating material related to one example of the present invention, the suitability of the dispensing apparatus can be determined by detecting the internal material of the dispensing apparatus from the heat-dissipating material discharged from the dispensing apparatus.

The invention claimed is:
1. A method for determining suitability of a dispensing apparatus for a heat-dissipating material, comprising:
   dispensing the heat-dissipating material from the dispensing apparatus;
   detecting an internal material of a structure of the dispensing apparatus from the heat-dissipating material dispensed from the dispensing apparatus, wherein the heat-dissipating material comprises a resin component of urethane series and a thermally conductive filler, wherein the internal material of the structure of the dispensing apparatus comprises iron (Fe); and wherein the iron (Fe) is detected using an ICP analysis, and determining suitability of the dispensing apparatus by:

establishing a predetermined threshold amount for the iron (Fe) in the heat-dissipating material; and determining whether the detected amount of the iron (Fe) is below the predetermined threshold amount, wherein the predetermined threshold amount is 30 mg/kg, and wherein the dispensing apparatus is determined to be suitable if the detected amount of the iron (Fe) is below the predetermined threshold amount.

2. The method according to claim 1, wherein the predetermined threshold amount is below 10 mg/kg.

3. The method according to claim 1, wherein the heat-dissipating material comprises a filler having a Mohs hardness of 8 or more.

4. The method according to claim 3, wherein the filler having the Mohs hardness of 8 or more is present in an amount of 80 wt % or more relative to a total weight of the filler in the heat-dissipating material.

5. The method according to claim 4, wherein the filler is present in an amount of 70 wt % or more relative to a total weight of the heat-dissipating material.

6. The method according to claim 1, wherein the dispensing apparatus comprises a dispensing part equipped with first and second supply pumps, and one or more static mixers individually connected to the first and second supply pumps, respectively, and the heat-dissipating material flows out through the static mixer.

7. The method according to claim 6, wherein the first supply pump is provided to supply a main resin and a thermally conductive filler to the static mixer, and the second supply pump is provided to supply a curing agent and the thermally conductive filler to the static mixer.

8. The method according to claim 6, wherein the first and second supply pumps are configured as a gear pump or a plunger, respectively.

9. A method for determining suitability of a dispensing apparatus for a heat-dissipating material, comprising:

dispensing the heat-dissipating material from the dispensing apparatus;

detecting an internal material of a structure of the dispensing apparatus from the heat-dissipating material dispensed from the dispensing apparatus, wherein the heat-dissipating material comprises a resin component of urethane series and a thermally conductive filler, wherein the internal material of the structure of the dispensing apparatus comprises iron (Fe); and wherein the iron (Fe) is detected using an ICP analysis, and determining suitability of the dispensing apparatus by:

establishing a predetermined threshold amount for the iron (Fe) in the heat-dissipating material; and determining whether the detected amount of the iron in the heat-dissipating material is below the predetermined threshold amount, wherein the predetermined threshold amount is 30 mg/kg, wherein the dispensing apparatus determined to be suitable if the detected amount of the iron (Fe) is below the predetermined threshold amount; and wherein the heat-dissipating material is configured to be injected into a battery module by the dispensing apparatus.

10. A method for determining suitability a dispensing apparatus for a heat-dissipating material, comprising:

dispensing the heat-dissipating material from the dispensing apparatus;

detecting an internal material of a structure of the dispensing apparatus from the heat-dissipating material dispensed from the dispensing apparatus, wherein the heat-dissipating material comprises a resin component of urethane series and a thermally conductive filler, wherein the internal material of the structure of the dispensing apparatus comprises iron (Fe); and wherein the iron (Fe) is detected using an ICP analysis, and determining suitability of the dispensing apparatus by:

establishing a predetermined threshold amount of the iron (Fe) in the heat-dissipating material; and determining whether the detected amount of the iron (Fe) is below the predetermined threshold amount, wherein the predetermined threshold amount is 30 mg/kg, wherein the dispensing apparatus is determined to be suitable if the detected amount of the iron (Fe) is below the predetermined threshold amount, wherein the dispensing apparatus comprises a dispensing part equipped with first and second supply pumps, and one or more static mixers individually connected to the first and second supply pumps, respectively, and the heat-dissipating material flows out through the static mixer to be injected into a battery module.

11. The method of claim 10, wherein the static mixture is configured to inject the heat-dissipating material into the battery module through a plurality of injection holes formed on the battery module.

\* \* \* \* \*